Figure 1:
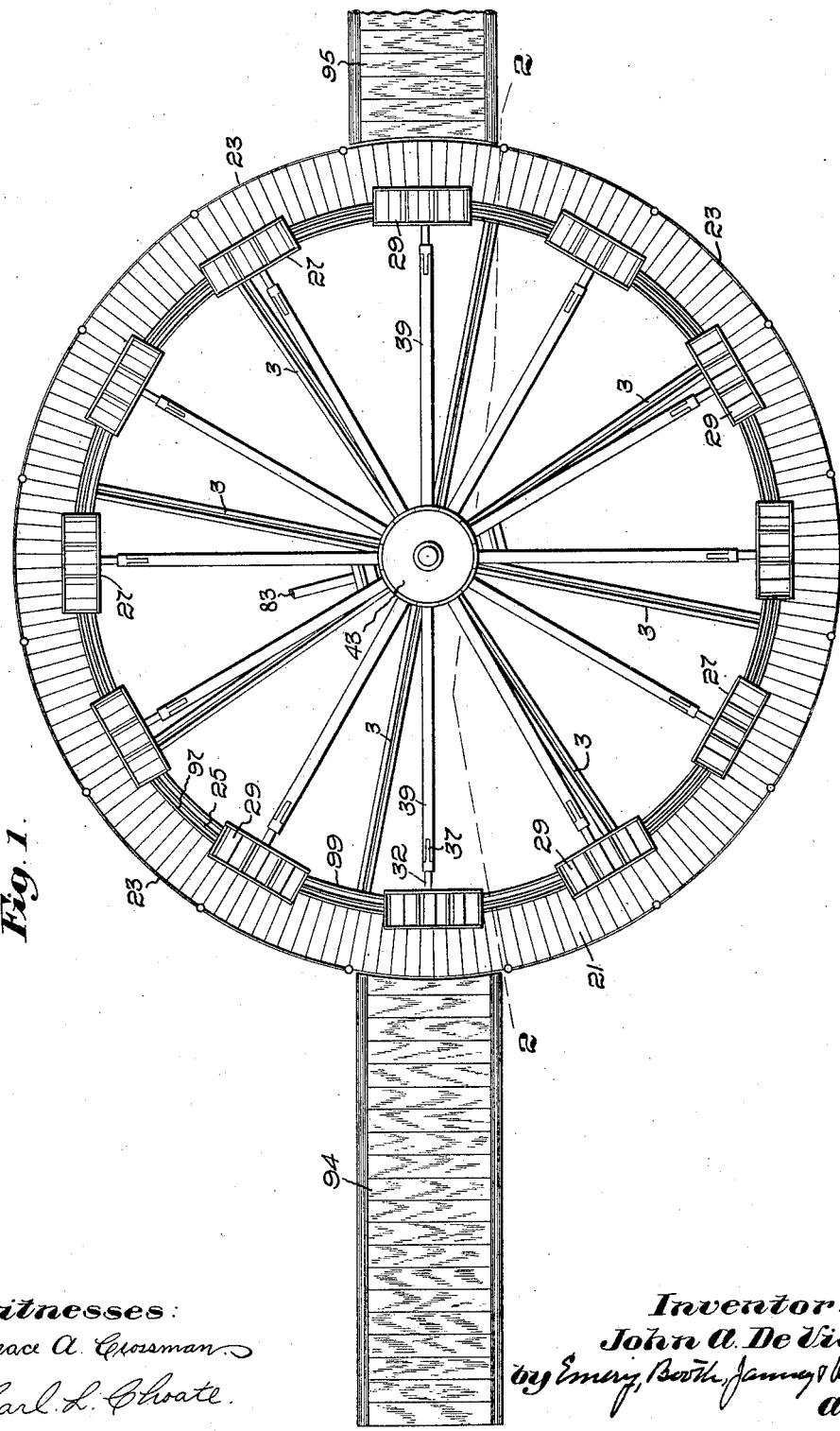

J. A. DE VITO.
ROUNDABOUT.
APPLICATION FILED MAY 19, 1910.

1,037,453.

Patented Sept. 3, 1912.
5 SHEETS—SHEET 1.

Witnesses:
Horace A. Crossman
Carl L. Choate

Inventor:
John A. De Vito.
by Emery, Booth, Janney & Varney
Attys.

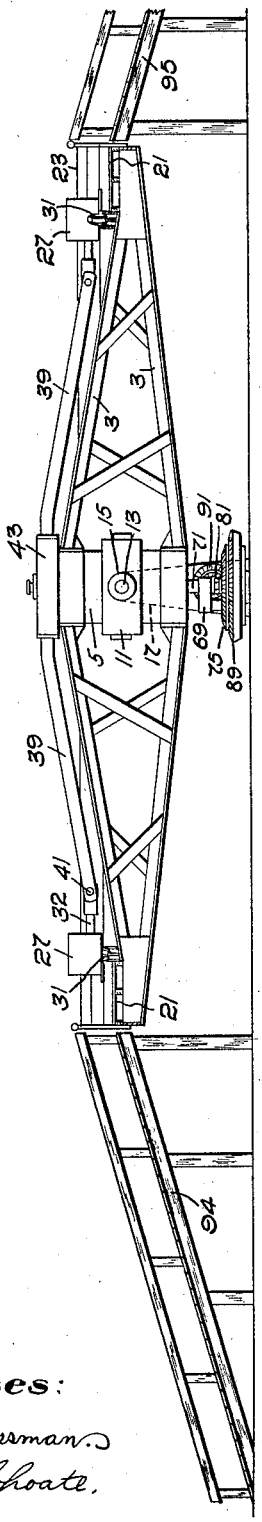
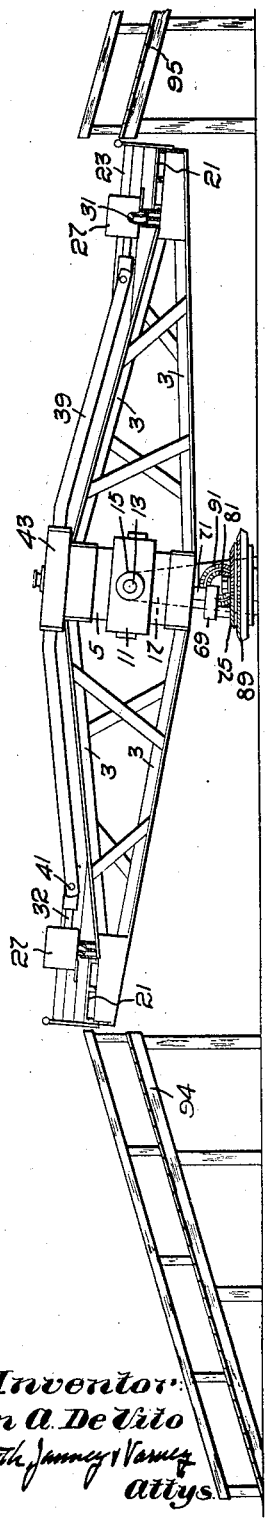

J. A. DE VITO.
ROUNDABOUT.
APPLICATION FILED MAY 19, 1910.
1,037,453.
Patented Sept. 3, 1912.
5 SHEETS—SHEET 3.
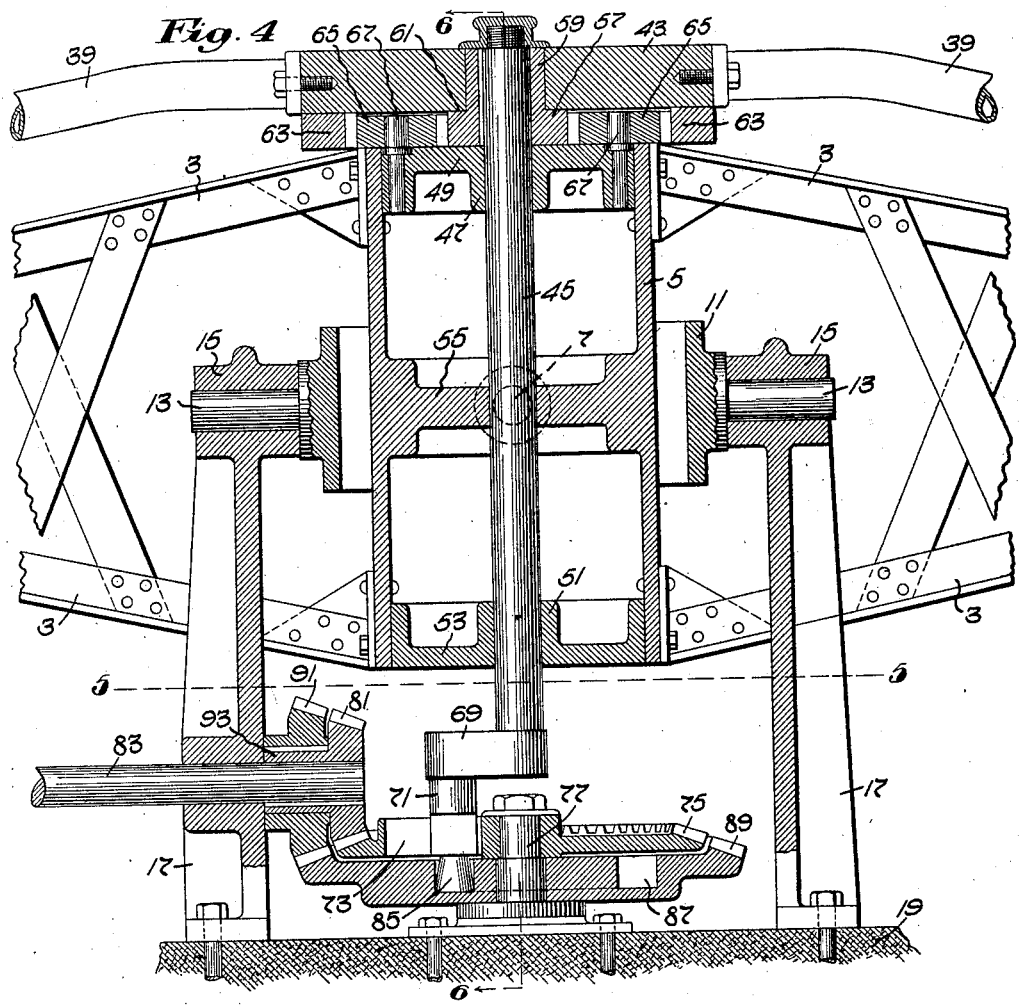
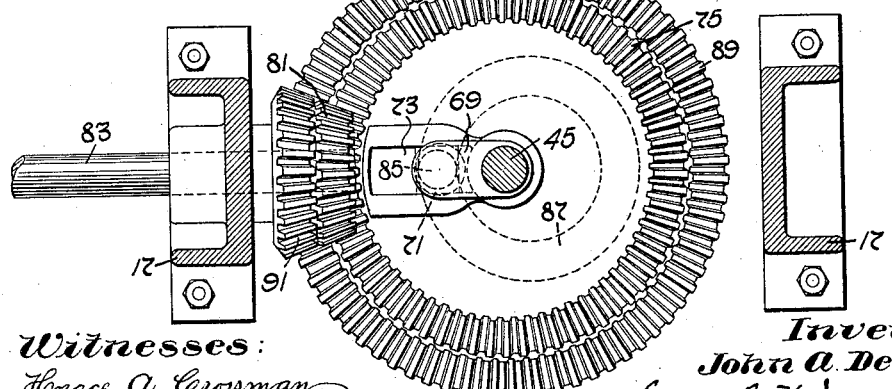
Witnesses:
Horace A. Crossman
Carl L. Choate.
Inventor:
John A. De Vito,
by Emery, Booth, Janney & Varney
Attys

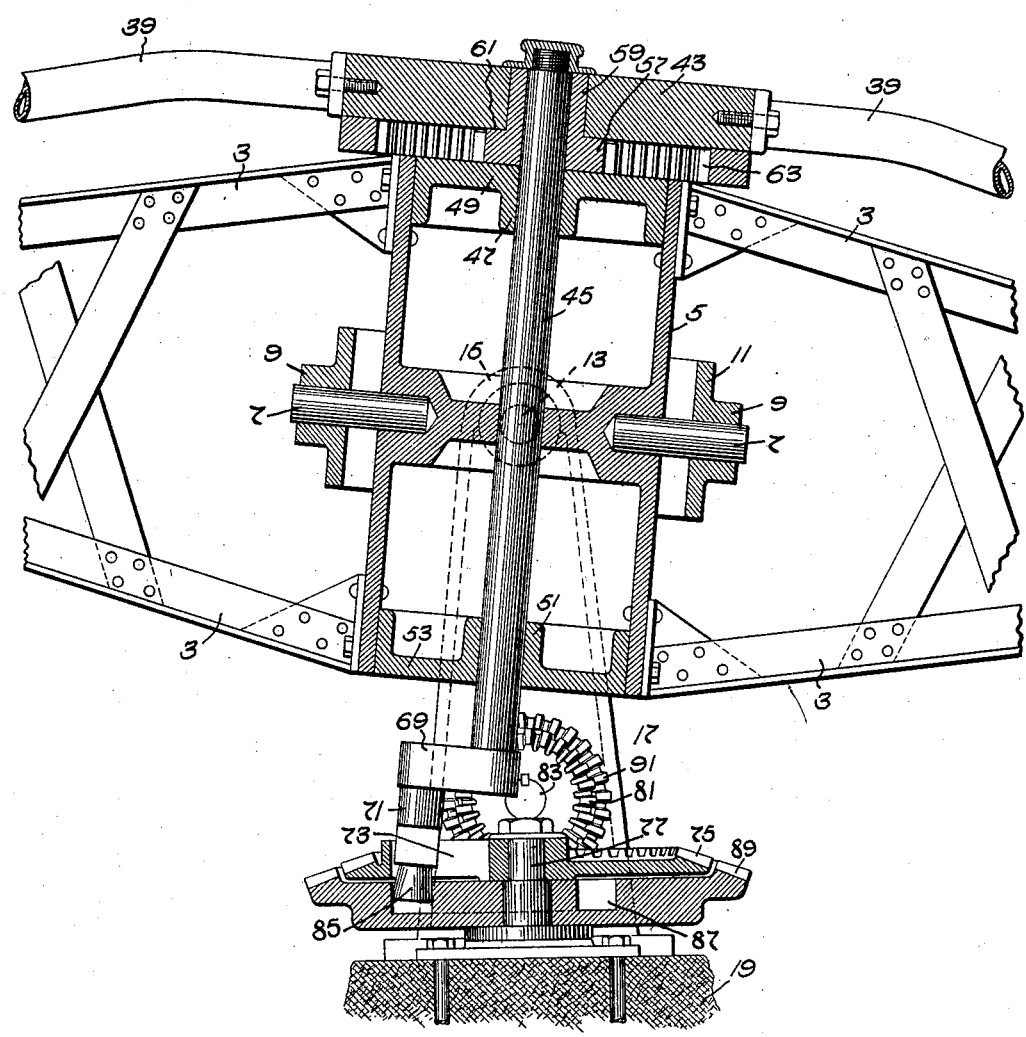

J. A. DE VITO.
ROUNDABOUT.
APPLICATION FILED MAY 19, 1910.
1,037,453.
Patented Sept. 3, 1912.
5 SHEETS—SHEET 5.
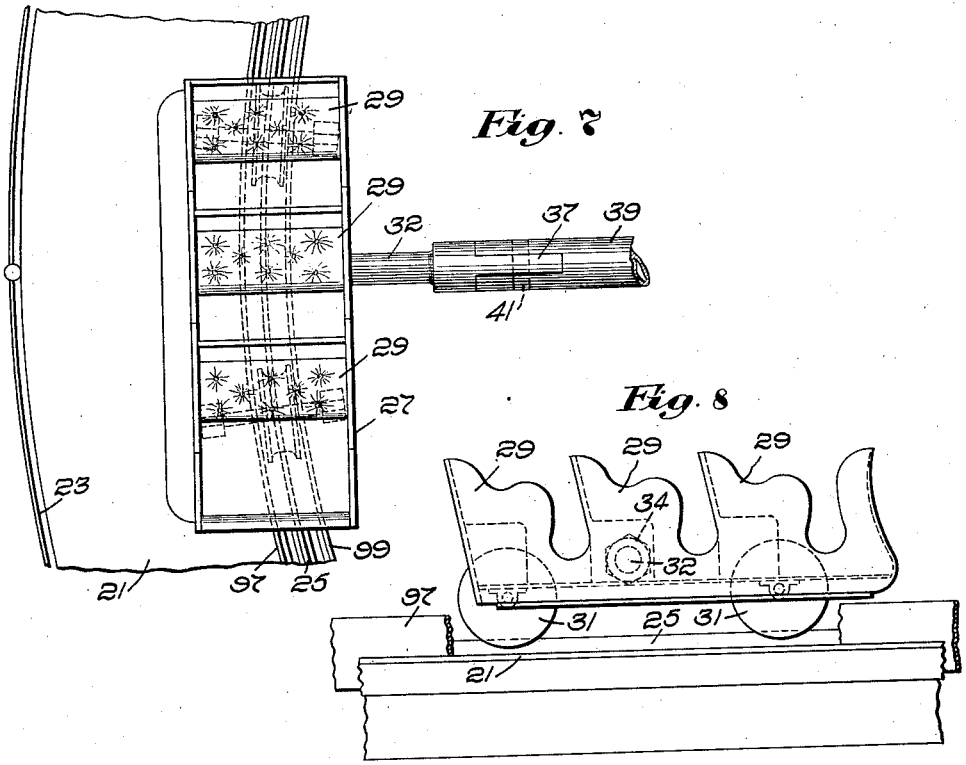
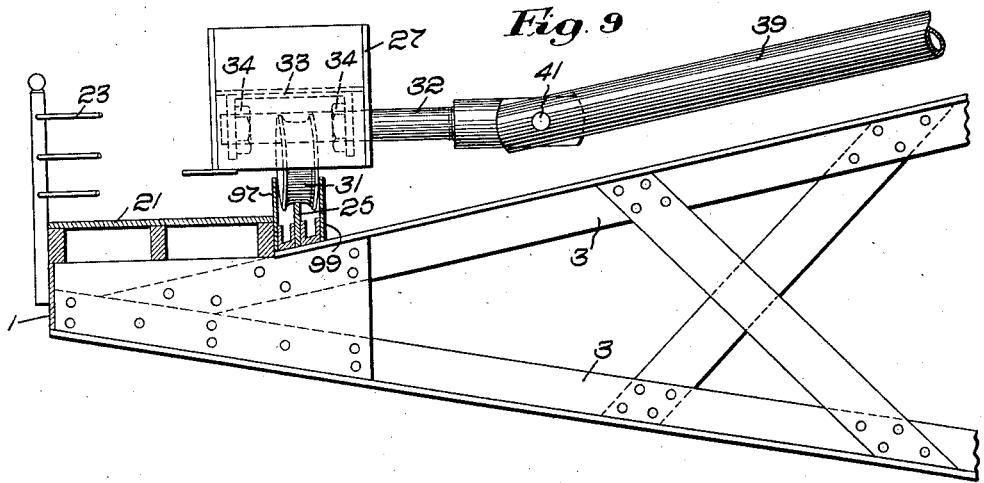
Witnesses:
Horace A. Crossman
Carl L. Choate.
Inventor:
John A. De Vito.
by Emery, Booth, Janney & Varney
Attys.

UNITED STATES PATENT OFFICE.

JOHN A. DE VITO, OF BOSTON, MASSACHUSETTS.

ROUNDABOUT.

1,037,453.  Specification of Letters Patent.  Patented Sept. 3, 1912.

Application filed May 19, 1910. Serial No. 562,176.

*To all whom it may concern:*

Be it known that I, JOHN A. DE VITO, a citizen of the United States, and a resident of Boston, in the county of Suffolk and State of Massachusetts, have invented an Improvement in Roundabouts, of which the following description, in connection with the accompanying drawings, is a specification, like letters on the drawings representing like parts.

This invention relates to amusement apparatus and among other objects aims to provide a mechanism for imparting to a support various movements to give passengers thereon an amusing sensation.

The character of the invention may be best understood by reference to the following description of an illustrated embodiment thereof shown in the accompanying drawings wherein:

Figure 1 is a plan of the apparatus shown herein as embodying my invention; Fig 2 is a section taken on line 2—2 of Fig. 1; Fig. 3 is a view similar to Fig. 2 showing the device in a different position; Fig. 4 on an enlarged scale is a vertical section showing portions of driving mechanism for the apparatus; Fig. 5 is a section taken on line 5—5 of Fig. 4; Fig. 6 is a vertical section taken on line 6—6 of Fig. 4; Fig. 7 on an enlarged scale is a plan of a car and track shown in Fig. 1; Fig. 8 is a side elevation of Fig. 7; and Fig. 9 is an end elevation of Fig. 7.

Referring to the drawings, the illustrative apparatus shown herein as embodying my invention comprises a support, herein in the form of a wheel consisting of a rim 1 (Fig. 9) and truss-frame spokes 3 connected at their outer ends to said rim and at their inner ends to a hollow cylindrical hub 5 (Fig. 4) having lateral trunnions 7 preferably located midway between the ends of said hub and projecting outwardly therefrom in opposite directions into boss bearings 9 in a ring 11 spaced from said hub sufficiently to allow relative rocking movement thereof. Projecting outwardly from the ring 11 at points transversely to the hub trunnions 7 are trunnions 13 journaled in boss bearings 15 at the upper ends of standards 17 having their bases secured to a suitable flooring 19. The transverse trunnions 7 and 13 constitute a universal fulcrum for said wheel.

Supported by the outer extremities of the spokes 3 is a circular platform 21 (Fig. 9) which may be provided at its outer edge with a suitable protecting railing 23. On this platform preferably adjacent its inner edge is a rail or track 25 on which are adapted to travel one or more carriers or passenger cars 27 of any suitable construction, said cars being shown herein as each provided with three seats 29 (Fig. 8). Each car is provided with two double flanged wheels 31 (Fig. 9) located centrally beneath the car one of said wheels being adjacent the forward and the other adjacent the rear end of the car. To permit the wheels to conform to the curvature of the rail 25 preferably their axes are arranged in alinement with radii of the circle formed by said rail. To propel the cars along said rail 25 and incidentally prevent tipping of said cars, each car may be provided with a short arm 32, projecting laterally through apertures in depending ends of a U-shaped bracket 33 which may conveniently be located beneath the middle seat of the car. Said arm may be adjustably secured to said bracket by nuts 34 threaded on to said arm and bearing against the inner faces of the depending ends of said bracket. The short arm 32 has a flattened end received in the bifurcated end of a long arm 39 and is pivoted thereto by a pin 41. By this pivotal connection the weight of the car is borne entirely by the rail 25 and is not shared by said arm. The long arms 39 project radially inward above the main car supporting wheel to a disk-like hub 43 (Fig. 4), said arms and hub constituting a car propelling wheel. To rotate said wheel there may be provided an upright shaft 45 journaled adjacent its upper end in a bearing 47 in a head 49 of the hub 5 referred to and journaled adjacent its lower end in a bearing 51 in a removable head 53 in said hub. To strengthen the hub 5 and provide additional bearing support for the shaft 45 said hub may be formed with a central stiffening web 55 containing a bearing for said shaft. Fast on the upper end of the shaft 45 is a gear 57 having an elongated hub 59 and a shoulder 61 constituting a journal for the driving disk 43 referred to. To transmit a rotative drive from the gear 57 to the disk 43 the latter is provided at its under face with an internal gear 63 driven from the gear 57 by one or more intermediate gears 65 journaled on pins 67 mounted in the upper head 49 of the hub 5. To rotate the shaft 45 its lower end may be provided with a crank 69 carying a crank pin 71 depending therefrom and occupying an elongated slot 73 in a horizontal gear 75 journaled on a reduced upper end of a stud shaft 77 rigidly secured to the flooring 19. The bevel gear 75 may be driven by a pinion 81 fast on a shaft 83 journaled in a bearing in one of the standards 17 referred to and adapted to be driven by an electric motor (not shown) or in any other suitable manner.

It will be apparent that as the shaft 83 is rotated, its bevel pinion 81 will rotate the bevel gear 75 and the slot 73 of the latter will cause the crank pin 71 to revolve around the stud shaft 77 and rotate the shaft 45. The latter will rotate the gear 57, and through the intermediate gears 65 and internal gear 63, will rotate the car arm driving hub 43 thereby causing the cars 27 to travel along the circular rail 25.

By my invention in addition to causing the cars to travel around the circular track, the track itself is given a wabbling or peculiar progressive undulating or wave-like motion causing an advancing elevation or depression of the track, the extent of the up and down movements being automatically varied.

Herein to give the track its movements, the crank pin 71 is provided with a depending reduced conical extension or cam follower 85 (Fig. 4) projecting through the gear slot 73 and occupying a cam or eccentric groove 87 in the upper face of a bevel gear 89 positioned beneath the bevel gear 75 referred to and journaled on the stud shaft 77, said gear being driven by a bevel pinion 91 herein fast on a hub 93 of the shaft driving pinion 81 referred to.

It will be apparent that if the gears 75 and 89 rotated together and if the shaft 45 remained in the vertical position as shown in Fig. 4 the crank pin 71 would remain at a uniform radial distance from the stud shaft 77, the shaft 45 would be given merely a movement of rotation and the track would remain in a horizontal position without oscillation. If, however, there is a relative or differential rotation of the gear 75 and the gear 89 the cam 87 will feed the crank pin 71 radially outwardly in the slot 73 and throw the shaft 45 out of a truly vertical position (Fig. 6). Herein this differential rotation is effected by the ratio of the gears 81, 75 to the gears 89, 91. The ratio preferably is such that the difference in speed of rotation of the gears 75 and 89 is very slight. As a result the crank pin 71 is fed gradually from the position shown in Fig. 4 outwardly in its slot to the position shown in Fig. 6. As soon as the shaft 45 is rocked from its truly vertical position somewhat said shaft will commence to wabble or oscillate. At first the amplitude of this movement will be slight, but as the crank pin is fed by the cam 87 gradually outwardly in the slot 73 the amplitude of the wabbling or oscillating movement will increase until the crank pin is in its extreme outward position when the amplitude of the wabbling movement will be at its maximum. After the crank pin has reached its outermost position the continued rotation of the cam gear 89 feeds the crank pin 71 gradually back inwardly toward the axis of the stud shaft 77 to bring the shaft 45 back to a truly vertical position as shown in Fig. 4. After the shaft 45 has been brought to its truly vertical position it is not immediately rocked therefrom but is caused to dwell for a period in its vertical position thereby maintaining the wheel at a horizontal level. To effect this dwell a short arc of the cam groove at its shortest radius is made truly circular with respect to the axis of the stud shaft 77 so that relative rotation of the cam gear and shaft driving gear for a period will not feed the crank pin 71 in its slot. When the crank pin has passed this truly circular portion of the cam it will again be fed gradually outwardly to its limit of outward movement and back again and caused to dwell as before. The movement of the shaft 45 from its vertical position of dwell or position of stable equilibrium to its most extreme inclination or position of most unstable equilibrium back to its vertical position constitutes a complete cycle of mutations of the wheel. Such cycles will continue to occur with a frequency dependent on the relative speeds of the cam and shaft gears. Since the cars are adjacent the outer extremity of the wheel spokes the amplitude of their oscillatory movement will be much greater than the amplitude of the oscillatory movement of the vertical shaft 45.

The combined movement of the oscillation and revolution of the crank pin 71 effects a progressive elevation of the circumference of the wheel giving the track a wavy or hilly motion the amplitude of the waves varying according to the distance of the crank pin 71 from the axis of the stud shaft 77. By the reduction speed gears 57, 65 and 63 the car driving arms are caused to make a fraction of a revolution while the shaft 45 is making a complete revolution.

Passengers may enter and leave the cars in any suitable manner as by gang-ways 94 and 95 (Fig. 1), one of said gang-ways preferably being used for passengers entering the cars and the other for passengers leaving the cars. These gang-ways lead to an elevation substantially level with the track when in its horizontal position or period of dwell. To prevent the cars from tipping over in case any mishap should occur to their driving arms, there may be provided er and outer supplemental rails 97 and 99 adjacent the wheel rail 25 and adapted under such circumstance to engage the sides of the car wheels and prevent tipping thereof.

In operation after the passengers have been seated in the cars the main driving shaft 83 is rotated. This rotates the shaft 45 and causes the cars to be propelled around the circular track 25. At first the track carrying wheel remains stationary for a short period until the crank pin 71 commences to feed outwardly in its slot 73, whereupon the track wheel will commence to wabble slightly at first and with gradually increasing amplitude of movement until the crank pin 71 is at its extreme outward position when the amplitude of wabbling movement will gradually decrease until the shaft 45 is in a vertical position, and the wheel will again remain for a short period in a horizontal position. The alternate periods of dwell and variable wabbling or progressive oscillation of the track accompanied by the travel of the cars on the latter give the passengers unique and amusing sensations.

The undulating track and car carrying frame is strong and simple in construction, its weight is supported by the strong ring and cylindrical hub, universal fulcrum pivots and does not bear on the car driving and frame oscillating mechanism. As a result the frame may be given its mutations and the cars propelled with minimum friction and resultant economy of power.

While herein an eccentric cam is shown for giving the wheel its peculiar movements it will be understood that the form of the cam may be varied to provide other movements of the track as desired.

Having described one embodiment of my invention without limiting myself thereto what I claim as new and desire to secure by Letters Patent is:

1. An apparatus of the class described comprising, in combination, a universally fulcrumed support; means to impart undulatory movement to said support; and means for automatically alternately increasing and decreasing the extents of the undulations.

2. An apparatus of the class described comprising, in combination, a universally fulcrumed support; and automatic means having provision for causing the support alternately to undulate and dwell.

3. An apparatus of the class described comprising, in combination, a universally fulcrumed support; and means to cause the same alternately to dwell and undulate, said means having provision for automatically varying the amplitude of the undulations.

4. An apparatus of the class described comprising, in combination, a support; a track thereon; cars on said track; means to propel said cars; and automatic means to cause said support alternately to dwell and undulate.

5. An apparatus of the class described comprising, in combination, a support; a track; cars on the latter; means to propel said cars on said track; and automatic means to cause said support to dwell for a period in a horizontal position and then undulate with an increasing amplitude of movement subsequently diminishing to a second period of dwell.

6. An apparatus of the class described comprising, in combination, a support; a track thereon; cars on the latter; means to propel said cars along said track; and automatic means to cause said support to undulate with an alternately increasing and decreasing amplitude of movement.

7. An apparatus of the class described comprising, in combination, a universally fulcrumed support; a track thereon; cars on said track; means to propel said cars along the latter; and means to impart to said support progressive, undulating movements of varying amplitude irrespective of the speed of said propelling means.

8. An apparatus of the class described comprising, in combination, a horizontally disposed, universally fulcrumed wheel; a track carried thereby; cars on the latter; means to propel said cars along said track; and automatic means to cause said wheel alternately to dwell and undulate with a movement of varying amplitude.

9. An amusement apparatus comprising, in combination, a universally fulcrumed support; and means including a cam for causing the latter alternately to dwell and undulate.

10. An amusement apparatus comprising, in combination, a universally fulcrumed support; a shaft journaled therein; and a cam coöperating with said shaft for imparting oscillating movements thereto.

11. An amusement apparatus comprising, in combination, a universally fulcrumed support; an upright shaft journaled therein; a crank on said shaft; and a cam coöperating with said crank to oscillate said shaft.

12. An amusement apparatus comprising, in combination, a universally fulcrumed support; a shaft journaled therein; and a cam coöperating with said shaft for causing the latter automatically, alternately to dwell and oscillate.

13. An amusement apparatus comprising, in combination, a universally fulcrumed support; a shaft journaled therein; and a cam coöperating with said shaft for holding the latter alternately in a vertical position and oscillating said shaft from said vertical position.

14. An amusement apparatus comprising, in combination, a universally fulcrumed support; a shaft journaled therein; and means coöperating with said shaft for rotating and oscillating the same.

15. An amusement apparatus comprising, in combination, a universally fulcrumed support; a shaft journaled therein; and cam means coöperating with said shaft for rotating and oscillating the same.

16. An amusement apparatus comprising, in combination, a universally fulcrumed support; a shaft journaled therein; a cam gear; a slotted gear; a crank on said shaft having a pin projecting through said slotted gear into said cam gear; and means relatively to rotate said gears to rotate said shaft and feed the latter from vertical to oblique positions.

17. An amusement apparatus comprising, in combination, a universally fulcrumed support; a shaft journaled therein; a cam gear; a crank on said shaft having a pin coöperating with said cam gear; and means to rotate the latter to impart variable mutations to said shaft.

18. An amusement apparatus comprising, in combination, a universally fulcrumed, non-rotative bearing; a support rotative thereon; and means to throw said support from a stable position to varying unstable positions.

19. An amusement apparatus comprising, in combination, a universally fulcrumed support; a shaft journaled therein; a shaft rotating gear; a shaft rocking gear; and means differentially to rotate said gears to rock and rotate said shaft.

20. An amusement apparatus comprising, in combination, a universally fulcrumed support; a shaft journaled therein; a crank on said shaft having a crank pin thereon; a gear having a cam slot receiving an end of said crank pin; a gear superposed on said cam gear and having a slot for receiving said crank pin; and means to rotate said gears at different speeds to cause said crank pin to revolve about the axes of said gears and rock toward and from said axes.

21. An amusement apparatus comprising, in combination, a universally fulcrumed support; a track thereon; cars on said track; and means simultaneously to propel said cars along said track and impart to said support an undulating movement of varying amplitude.

22. An amusement apparatus comprising, in combination, a universally fulcrumed support; a track thereon; cars on said track; a shaft journaled in said support; connections from said shaft to said cars; and means to rotate said shaft.

23. An amusement apparatus comprising, in combination, a universally fulcrumed support; a track thereon; cars on said track; a shaft journaled in said support; connections from said shaft to said cars; and means to rotate and oscillate said shaft.

24. An amusement apparatus comprising, in combination, a universally fulcrumed support; a track thereon; cars on said track; a shaft journaled in said support; a crank on said shaft; a slotted gear for rotating said crank to propel said cars along said track; and a cam gear coöperating with said crank rotating gear to radially feed said shaft.

25. An amusement apparatus comprising, in combination, a universally fulcrumed support; a track thereon; cars on said track; a shaft journaled in said support; a wheel having arms connected to said cars for propelling the latter along said track; transmission means from said shaft to said wheel for rotating the latter from the former; and means to rotate and oscillate said shaft.

26. An amusement apparatus comprising, in combination, a universally fulcrumed support; a track thereon; cars on said track; a hub; radial arms connected at their outer ends to said cars and at their inner ends to said hub; an internal gear for said hub; a shaft journaled in said support; a gear fast thereon; an intermediate gear meshing with said shaft gear and internal gear for transmitting rotative movement from said shaft to said hub; and means to rotate and oscillate said shaft.

27. An amusement apparatus comprising, in combination, a universally fulcrumed support; a monorail track thereon; cars having wheels centrally positioned beneath the same on said track; means to propel said cars along said track; and means to undulate the latter with varying amplitude.

28. In an apparatus of the class described the combination of a support, a mono-rail track thereon; cars; flanged wheels supporting said cars on said track; means to propel said cars along said track, and supplemental emergency rails for coöperation with opposite sides of said wheels to prevent tipping of said cars.

29. In an apparatus of the class described the combination of a support, a mono-rail track thereon; a car; flanged wheels supporting said car on said track; means to propel said car along said track, and means including a supplemental emergency rail extending upwardly a substantial distance toward the centers of said wheels for coöperation with sides thereof to prevent tipping of said car.

In testimony whereof, I have signed my name to this specification, in the presence of two subscribing witnesses.

JOHN A. DE VITO.

Witnesses:
HENRY T. WILLIAMS,
ROBERT H. KAMMLER.

Copies of this patent may be obtained for five cents each, by addressing the "Commissioner of Patents, Washington, D. C."